(No Model.)

I. M. HOFFMAN.
DISPLAY WAGON.

No. 302,844. Patented July 29, 1884.

Witnesses:
John G. Hinkel
H. E. Hansmann

Irenias M. Hoffman
Inventor:
By Foster & Freeman
Attorneys.

UNITED STATES PATENT OFFICE.

IRENIAS M. HOFFMAN, OF INDIANAPOLIS, INDIANA.

DISPLAY-WAGON.

SPECIFICATION forming part of Letters Patent No. 302,844, dated July 29, 1884.

Application filed May 1, 1884. (No model.)

*To all whom it may concern:*

Be it known that I, IRENIAS M. HOFFMAN, a citizen of the United States, residing at Indianapolis, in the county of Marion and State of Indiana, have invented certain new and useful Improvements in Display-Wagons, of which the following is a specification.

My invention is a vehicle constructed, as fully described hereinafter, so as to facilitate the exhibition and properly preserve articles of food and other merchandise which it is desirable to vend in the streets or public roads.

Figure 1:
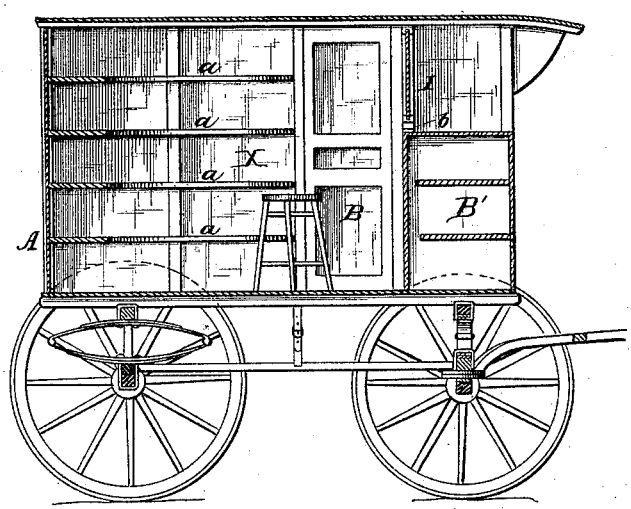
Figure 2:
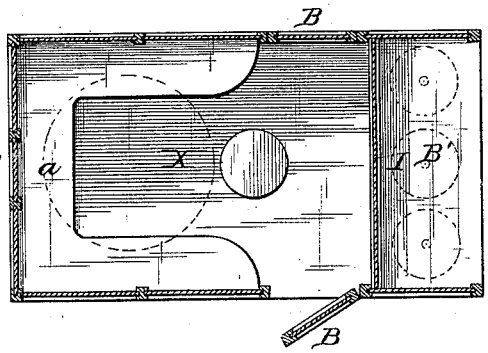
Figure 3:
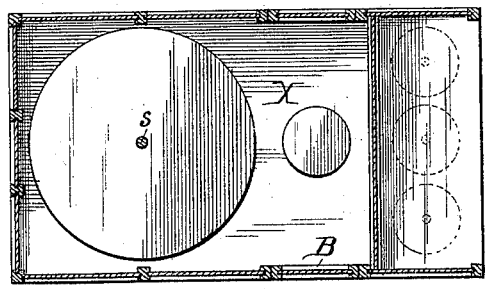

In the drawings, Figure 1 is a sectional elevation of a vehicle embodying my invention. Fig. 2 is a sectional plan, and Fig. 3 is a sectional plan showing a modification.

The body A of the vehicle may be of any suitable form and dimensions, that shown being oblong, and being supported by the wheels upon any suitable spring-platform. The door or doors B may be placed at the sides or end, as may be desired; and the sides of the vehicle, instead of being open or with leather or oil-cloth coverings, consist of glass sashes, within which are arranged shelves $a$, in such manner as to best hold the articles which are to be sold, the said shelves being in immediate proximity to the glass sides, so as to fully display the contents, but also being otherwise so arranged that there is a chamber or space, X, for the driver and attendant; and at the front of the vehicle a case, B', is formed, and, if desirable, provided with shelves or otherwise, so as to be easily accessible from within. A sash, I, may close the vehicle above the case B', with the exception of a small opening, $b$, for the passage of the reins. As thus constructed a most extended space is secured for the reception and display of the articles to be sold, while they are secluded and preserved from injury by dust or the weather, and the driver, while having his team under proper management and control, can always occupy a position so as to readily reach any article, and can, by opening the door B, pass it without inconvenience to the purchaser. The precise arrangement of the shelves is not material, provided they are in such proximity to the glass sides as to secure a proper display of the contents, and provided there is a space, X, for the driver and salesman, and proper facilities for him to reach the articles. The shelves may be circular, as in dotted lines, Fig. 2; or they may be upon a spindle, $s$, arranged to revolve in bearings in the vehicle, care being taken to arrange the shelves to leave a space, X, for the attendant adjacent to the door B, and permitting access to the front of the vehicle. In either case the goods are not only fully displayed, but the attendant has ready access to all the shelves and to the door, and has as perfect control of the team as in ordinary wagons.

I claim—

1. The combination, in a vendor's vehicle, of a closed body having one or more doors, glass sides and back, shelving arranged in proximity to said sides and back, and a chamber, X, adjacent to the shelving and to the door, substantially as set forth.

2. The combination, in a vendor's vehicle, of a closed body having glass sides, doors, and back, shelving adjacent to the glass sides and back, chamber X, and a front casing, B', substantially as set forth.

3. The combination, in a vendor's vehicle, of a closed body having one or more doors, glass sides and back, a rotary shelving, and a chamber, X, adjacent to the shelving, substantially as set forth.

In testimony whereof I have signed my name to this specification in the presence of two subscribing witnesses.

IRENIAS M. HOFFMAN.

Witnesses:
WILLIAM M. COVAL,
ALFRED F. POTTS.